(12) United States Patent
Kawada

(10) Patent No.: US 8,603,698 B2
(45) Date of Patent: Dec. 10, 2013

(54) ELECTROLYTE FOR FUEL CELL, ELECTROLYTE MEMBRANE FOR FUEL CELL, BINDER FOR FUEL CELL, MEMBRANE ELECTRODE ASSEMBLY FOR FUEL CELL, AND FUEL CELL

(75) Inventor: Nobuo Kawada, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 1104 days.

(21) Appl. No.: 12/594,434

(22) PCT Filed: Apr. 1, 2008

(86) PCT No.: PCT/JP2008/056474
§ 371 (c)(1),
(2), (4) Date: Oct. 2, 2009

(87) PCT Pub. No.: WO2008/123522
PCT Pub. Date: Oct. 16, 2008

(65) Prior Publication Data
US 2010/0143764 A1 Jun. 10, 2010

(30) Foreign Application Priority Data
Apr. 2, 2007 (JP) .................................. 2007-096141

(51) Int. Cl.
*H01M 8/10* (2006.01)
(52) U.S. Cl.
USPC ........... 429/493; 429/479; 429/483; 429/494; 429/495
(58) Field of Classification Search
USPC .......................... 429/479, 483, 493, 494, 495
See application file for complete search history.

(56) References Cited

U.S. PATENT DOCUMENTS

| 7,935,735 B2 * | 5/2011 | Li et al. ........................... 521/27 |
| 2005/0181257 A1 * | 8/2005 | Jung et al. ....................... 429/33 |

FOREIGN PATENT DOCUMENTS

| JP | 8-73739 | 3/1996 |
| JP | 2005-68347 | 3/2005 |
| JP | 2005 248114 | 9/2005 |
| JP | 2005 272780 | 10/2005 |
| JP | 2005-350658 | 12/2005 |
| JP | 2006 179448 | 7/2006 |
| JP | 2006 269250 | 10/2006 |
| JP | 2006 335925 | 12/2006 |
| JP | 2007-51272 | 3/2007 |

OTHER PUBLICATIONS

Industrial Material, Nikkan Kogyo Shinbun, Engineering Materials, vol. 51, No. 4, p. 34-39 (2003).
Extended European Search Report issued Mar. 11, 2011, in Application No. / Patent No. 08739587.7-2119 / 2133949 PCT/JP2008056474.
Hirokazu Munakata, et al., "Properties of composite proton-conducting membranes prepared from three-dimensionally ordered macroporous polymide matrix and polyelectrolyte", Chemical Communication [online], XP002624981, 2005, pp. 3986-3988.

* cited by examiner

*Primary Examiner* — Patrick Joseph Ryan
*Assistant Examiner* — Julian Anthony
(74) *Attorney, Agent, or Firm* — Oblon, Spivak, McClelland, Maier & Neustadt, L.L.P.

(57) ABSTRACT

Disclosed is an electrolyte for fuel cells, which is mainly composed of a copolycondensate of a polyimide having an alkoxysilyl group at an end and an alkoxysilane having an ion-conducting group. Also disclosed are an electrolyte membrane for fuel cells, a binder for fuel cells and a membrane electrode assembly for fuel cells, each using the electrolyte, and a fuel cell using such a membrane electrode assembly for fuel cells. The electrolyte enables to obtain an electrolyte membrane, a binder and a membrane electrode assembly, each having high ion conductivity, high strength, high toughness, low swelling and low fuel permeability suitable for fuel cells. By using such an electrolyte, there can be obtained a low-cost fuel cell having high output power and high durability.

12 Claims, No Drawings

ELECTROLYTE FOR FUEL CELL, ELECTROLYTE MEMBRANE FOR FUEL CELL, BINDER FOR FUEL CELL, MEMBRANE ELECTRODE ASSEMBLY FOR FUEL CELL, AND FUEL CELL

TECHNICAL FIELD

This invention relates to electrolytes suited for use in fuel cells, and fuel cell electrolyte membranes, fuel cell binders, fuel cell membrane electrode assemblies, and fuel cells using the same.

BACKGROUND ART

Required of electrolyte membranes for fuel cells are high ion conductivity, high strength, high toughness, high heat resistance, high durability, low swell, low fuel permeability, low cost, low environmental load and the like. Especially in direct methanol fuel cells, a high ion conductivity, high strength, high toughness, low swell, and low fuel permeability are required. With respect to such electrolyte membranes for fuel cells, studies have been made on perfluorosulfonic acid polymers, sulfonated forms of aromatic hydrocarbon polymers as typified by sulfonated polyimides, sulfonated fluoro-polymers to which styrene is radiation grafted, and inorganic/organic hybrid materials.

The perfluorosulfonic acid polymers offer a high ion conductivity at a relatively low ion-exchange capacity, but suffer from a high fuel permeability due to an extremely high degree of swelling in methanol.

In the case of sulfonated polyimides, the ion-exchange capacity must be increased to acquire a high ion conductivity. The increased ion-exchange capacity, however, allows for swelling in water, with the drawback of an extreme drop of strength.

In the case of sulfonated fluoro-polymers having styrene radiation-grafted thereto, an extreme drop of strength does not occur even when the ion-exchange capacity is increased to acquire a high ion conductivity. However, the increased ion-exchange capacity allows for swelling in water, raising a problem of increased fuel permeability.

In the case of inorganic/organic hybrid materials, increasing a proportion of the inorganic component may be effective in restraining swell, but give rise to a problem of impairing toughness and becoming fragile. Those materials in which polyurethane is used as the organic component to increase toughness exhibit a high toughness in a dry state due to the hydrogen bond between urethane links, but suffer from an abrupt drop of strength upon water absorption because the hydrogen bond between urethane links is prohibited by water.

Patent Document 1: JP-A H08-501653
Patent Document 2: JP-A 2000-510511
Patent Document 3: JP-A H08-503574
Patent Document 4: JP-A 2003-100316
Patent Document 5: JP-A 2004-273386
Non-Patent Document 1: Industrial Material, April 2003, Nikkan Kogyo Shinbun

DISCLOSURE OF THE INVENTION

Problem to be Solved by the Invention

An object of the invention which has been made under the above-discussed circumstances is to provide a fuel cell-use electrolyte capable of forming an electrolyte membrane, a binder and a membrane electrode assembly each having a high ion conductivity, high strength, high toughness, low swell, and low fuel permeability suited for use in fuel cells; and a fuel cell electrolyte membrane, fuel cell binder, and fuel cell membrane-electrode assembly each using the electrolyte, as well as a fuel cell using the membrane electrode assembly.

Means for Solving the Problem

Making extensive investigations to attain the above object, the inventor has found that an electrolyte composed mainly of a copolycondensate of a polyimide terminated with an alkoxysilyl group and an alkoxysilane having an ion-conducting group is capable of forming an electrolyte membrane, a binder and a membrane electrode assembly each having a high ion conductivity, high strength, high toughness, low swell, and low fuel permeability suited for use in fuel cells, and that using the electrolyte, a fully durable fuel cell capable of producing high power can be manufactured at a low cost.

Accordingly, the invention provides a fuel cell electrolyte, fuel cell electrolyte membrane, fuel cell binder, fuel cell membrane electrode assembly, and fuel cell, as defined below.

Embodiment 1:
An electrolyte for fuel cells, comprising as a main component a copolycondensate of a polyimide terminated with an alkoxysilyl group and an alkoxysilane having an ion-conducting group.

Embodiment 2:
The fuel cell electrolyte of embodiment 1 wherein the polyimide terminated with an alkoxysilyl group is of the formula (1)

[Chemical Formula 1]

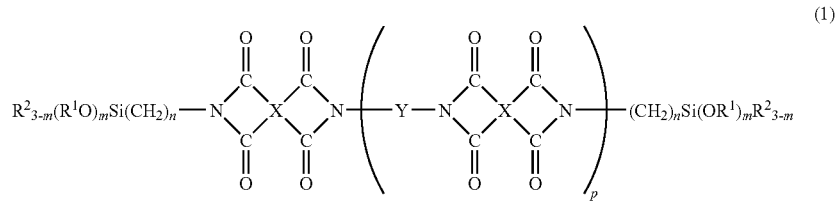

(1)

wherein $R^1$ is alkyl, $R^2$ is a monovalent hydrocarbon group of 1 to 8 carbon atoms, X is a tetravalent organic group having at least one aromatic ring, Y is a divalent organic group, n is an integer of 0 to 6, p is an integer of 0 to 9, and m is an integer of 1 to 3.

Embodiment 3:
The fuel cell electrolyte of embodiment 1 or 2 wherein the ion-conducting group is a sulfonic acid group.

Embodiment 4:
The fuel cell electrolyte of embodiment 3 wherein the sulfonic acid group is obtained from oxidation of a mercapto group.

Embodiment 5:
The fuel cell electrolyte of embodiment 3 wherein the sulfonic acid group is obtained by adding a vinyl-containing sulfonic acid or a salt thereof to a mercapto group.

Embodiment 6:
An electrolyte membrane for fuel cells, comprising the electrolyte of any one of embodiments 1 to 5.

Embodiment 7:
A binder for fuel cells, comprising the electrolyte of any one of embodiments 1 to 5.

Embodiment 8:
A membrane electrode assembly for fuel cells, comprising the electrolyte membrane of embodiment 6.

Embodiment 9:
A fuel cell comprising the membrane electrode assembly of embodiment 8.

Embodiment 10:
The fuel cell of embodiment 9 which is a direct methanol fuel cell.

Unlike a sulfonated polyimide having an ion-conducting group bonded to a polyimide skeleton directly or via a short chain, the electrolyte of the invention has a structure consisting of hydrophobic polyimide blocks and ion-conducting group-bearing hydrophilic silsesquioxane blocks formed from an alkoxysilane and an alkoxysilyl group at an end of polyimide. Since the hydrophobic domain is spaced fully apart from the hydrophilic domain, the structure is unsusceptible to swelling in water and methanol. As a consequence, the electrolyte of the invention, and the electrolyte membrane, binder and membrane electrode assembly using the same may exhibit the strength polyimide possesses in itself.

The electrolyte of the invention results from copolycondensation of hydrophobic polyimide blocks with hydrophilic silsesquioxane blocks having an ion-conducting group and thus has the structure that very strong, very tough polyimide is crosslinked with robust siloxane bonds. The electrolyte enables to form an electrolyte membrane, a binder and a membrane electrode assembly, each having very high strength and toughness. A high ion conductivity is available because ion-conducting groups are concentrated in hydrophilic domains. Additionally, hydrophobic domains are difficulty swollen with water and methanol because the hydrophobic domains are spaced fully apart from the hydrophilic domains. Then the intermolecular force between polyimide chains is not inhibited, permitting the polyimide to exert its own high strength and toughness.

Further, the electrolyte of the invention includes the hydrophilic domains which have a silsesquioxane skeleton that is crosslinked with robust siloxane bonds. Then the electrolyte membrane, binder and membrane electrode assembly using the electrolyte are unsusceptible to swelling in water or methanol and have a lower permeability of water or methanol.

It is notable that an inorganic/organic hybrid material using polyurethane which exerts a higher toughness due to hydrogen bonds between urethane links loses toughness upon water absorption because water molecules readily infiltrate between urethane links. By contrast, the electrolyte of the invention which exerts a high toughness due to strong intermolecular forces by the robust planar structure of polyimide maintains the toughness even upon water absorption because of the difficulty with which water molecules infiltrate between molecules.

By virtue of these actions, the electrolyte membrane, binder and membrane electrode assembly of the invention have a high ion conductivity, high strength and high toughness as well as a low swell and low fuel permeability.

Advantageous Effects of the Invention

The electrolyte of the invention enables to form an electrolyte membrane, a binder and a membrane electrode assembly, each having a high ion conductivity, high strength, high toughness, low swell, and low fuel permeability suitable for use in fuel cells. By applying the electrolyte to fuel cells, a fuel cell featuring a high power, high durability and low cost can be fabricated.

BEST MODE FOR CARRYING OUT THE INVENTION

The electrolyte of the invention comprises as a main component a copolycondensate which is constructed by copolycondensation of a polyimide terminated with an alkoxysilyl group and an alkoxysilane having an ion-conducting group.

The polyimide terminated with an alkoxysilyl group is preferably selected from those free of an ion-conducting group such as sulfonic acid group or a substituent group which is convertible into an ion-conducting group, such as mercapto group. Specific polyimides are of the formula (1):

[Chemical Formula 2]

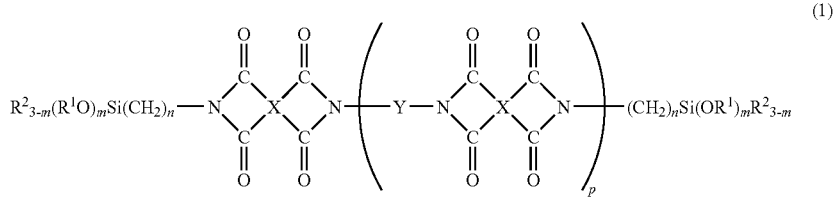

(1)

wherein $R^1$ is alkyl, $R^2$ is a monovalent hydrocarbon group of 1 to 8 carbon atoms, X is a tetravalent organic group having at least one aromatic ring, Y is a divalent organic group, n is an integer of 0 to 6, p is an integer of 0 to 9, and m is an integer of 1 to 3.

Herein $R^1$ is alkyl, examples of which include methyl and ethyl. $R^2$ is a monovalent hydrocarbon group of 1 to 8 carbon atoms, examples of which include alkyl groups such as methyl, ethyl, n-propyl, isopropyl, n-butyl, isobutyl and tert-butyl, cycloalkyl groups such as cyclohexyl, aryl groups such as phenyl, and benzyl, phenethyl and the like.

X is a tetravalent organic group having at least one aromatic ring, examples of which include those of the following formulae.

[Chemical Formula 3]

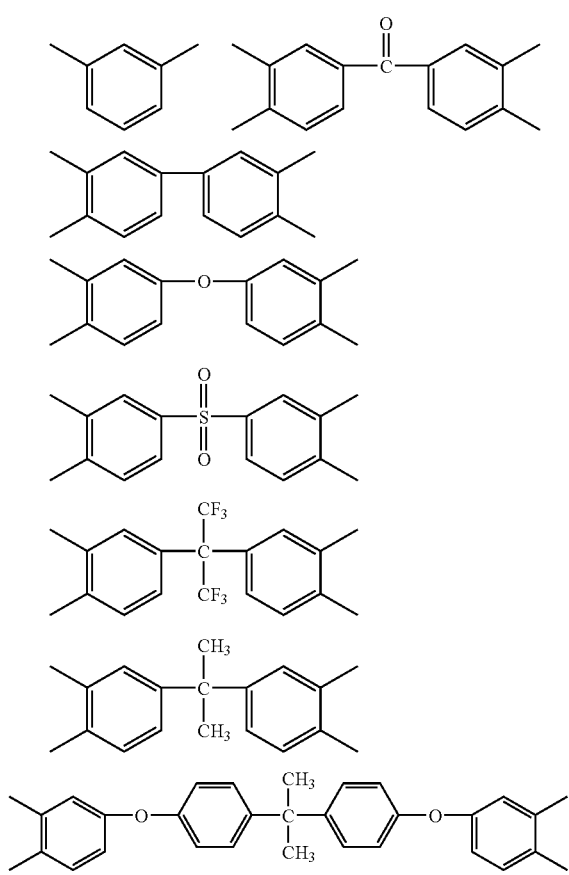

Y is a divalent organic group, examples of which include those of the following formulae.

[Chemical Formula 4]

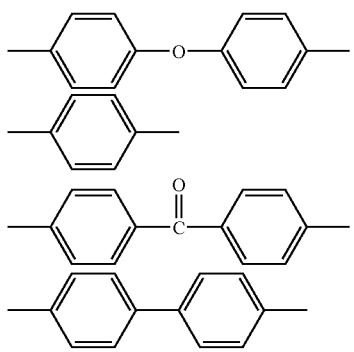

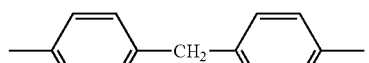
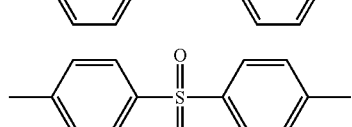
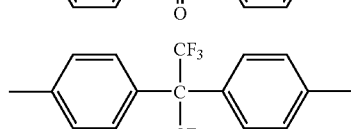
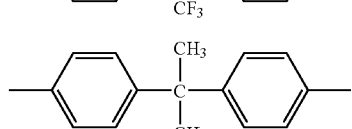
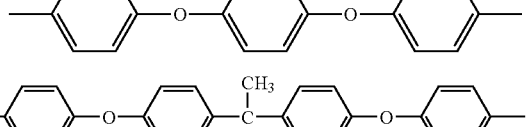
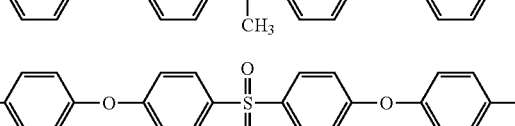
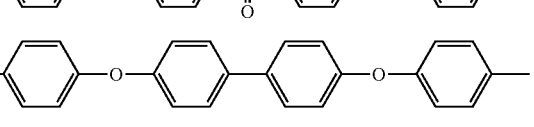
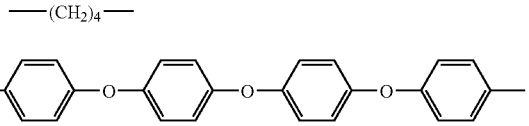

—(CH$_2$)$_4$—

—(CH$_2$)$_6$—

The copolycondensate of the invention may be prepared, for example, by reacting a polyimide precursor terminated with an alkoxysilyl group with an alkoxysilane having a substituent group which is convertible into an ion-conducting group to effect copolycondensation and imidization and then converting the substituent group into an ion-conducting group.

With regard to the polyimide precursor that forms the polyimide terminated with an alkoxysilyl group, for example, suitable precursors that form the polyimide of formula (1) include polyamic acids of the following formula (2):

[Chemical Formula 5]

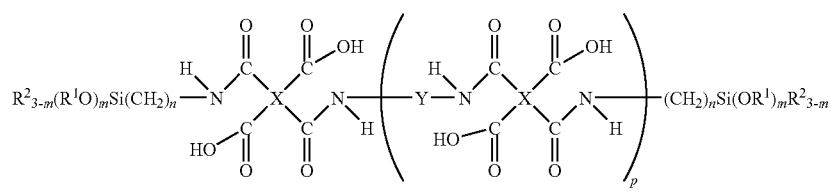

(2)

wherein $R^1$, $R^2$, X, Y, n, p, and m are as defined in formula (1), with the proviso that some of the amide acid structures:

[Chemical Formula 6]

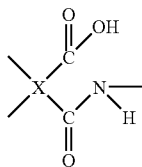

in the polyimide precursor may be imide structures:

[Chemical Formula 7]

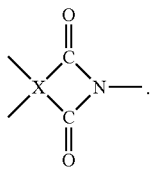

The polyimide precursor terminated with an alkoxysilyl group may be prepared by reacting a tetracarboxylic acid dianhydride with a diamine compound to form a polyamide precursor and further reacting the polyamide precursor with an alkoxysilane having an amino group, specifically an alkoxysilane having a silicon-bonded aminoalkyl group. Suitable tetracarboxylic acid dianhydrides are of the formula (3):

[Chemical Formula 8]

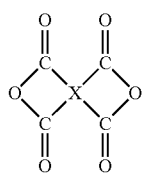 (3)

wherein X is as defined in formula (1) and include pyromellitic dianhydride, 3,3',4,4'-benzophenone-tetracarboxylic acid dianhydride, 3,3',4,4'-biphenyl-tetracarboxylic acid dianhydride, 4,4'-oxydiphthalic acid dianhydride, bis(3,4-dicarboxyphenyl)sulfone dianhydride, 2,2-bis(3,4-dicarboxyphenyl)-1,1,1,3,3,3-hexafluoropropane dianhydride, 2,2-bis(3,4-dicarboxyphenyl)propane dianhydride, 2,2-bis[4-(3,4-dicarboxyphenoxy)phenyl]propane dianhydride, and isomers of the foregoing compounds which differ in the position of substituent group on aromatic ring; and suitable diamine compounds are of the formula (4):

$H_2N-Y-NH_2$ (4)

wherein Y is as defined in formula (1) include diaminodiphenyl ether, 1,4-diaminobenzene, 4,4'-diaminobenzophenone, 4,4'-diaminobiphenyl, 4,4'-diaminodiphenylmethane, bis(4-aminophenyl)sulfone, 2,2-bis(4-aminophenyl)-1,1,1,3,3,3-hexafluoropropane, 2,2-bis(4-aminophenyl)propane, 1,4-bis(4-aminophenoxy)benzene, 2,2-bis[4-(4-aminophenoxy)phenyl]propane, 2,2-bis[4-(4-aminophenoxy)phenyl]sulfone, 4,4'-bis(4-aminophenoxy)biphenyl, bis[4-(4-aminophenoxy)phenyl]ether, and isomers of the foregoing compounds which differ in the position of substituent group on aromatic ring, and aliphatic amines, typically butane diamine and hexamethylene diamine.

As the alkoxysilane having an amino group, those having three alkoxy groups on a silicon atom are preferred. Exemplary aminoalkyl groups include aminomethyl, 2-aminoethyl and 3-aminopropyl. Exemplary alkoxy groups include methoxy and ethoxy. Specific examples of the alkoxysilane having an amino group include 3-aminopropyltrimethoxysilane, 3-aminopropyltriethoxysilane, 3-aminopropyldimethoxymethylsilane, 3-aminopropyldiethoxymethylsilane, 3-aminopropyldimethylmethoxysilane, and 3-aminopropyldimethylethoxysilane.

The polyimide precursor terminated with an alkoxysilyl group may be prepared by reacting a tetracarboxylic acid dianhydride with a diamine compound, optionally in a solvent, for example, at a temperature of 20 to 30° C. and in a dehydrating environment, and further reacting with an alkoxysilane having an amino group, for example, at a temperature of 20 to 70° C. and in a dehydrating environment. This precursor can be imidized by heating during the copolycondensation with an alkoxysilane having a substituent group which is convertible into an ion-conducting group.

As the alkoxysilane having a substituent group which is convertible into an ion-conducting group, those having three alkoxy groups on a silicon atom are preferred. Also preferred are those alkoxysilanes having a mercapto-containing group, specifically a silicon-bonded mercaptoalkyl group, as the substituent group which is convertible into an ion-conducting group. By oxidation, the mercapto group can be converted into a sulfonic acid group. Alternatively, the precursor may be endowed with a sulfonic acid group by adding a vinyl-containing sulfonic acid or salt thereof to the mercapto group.

Examples of the mercaptoalkyl group include 2-mercaptoethyl, 3-mercaptopropyl, and 4-mercaptobutyl. Exemplary alkoxy groups include methoxy and ethoxy. Specific examples of the mercapto-containing alkoxysilane include 3-mercaptopropyltrimethoxysilane, 3-mercaptopropyltriethoxysilane, 3-mercaptodimethoxymethylsilane, 3-mercaptopropyldiethoxymethylsilane, 3-mercaptopropyldimethylmethoxysilane, and 3-mercaptopropyldimethylethoxysilane.

Copolycondensation of a polyimide precursor terminated with an alkoxysilyl group with an alkoxysilane having a substituent group which is convertible into an ion-conducting group may be conducted by subjecting the polyimide precursor terminated with an alkoxysilyl group and the alkoxysilane having a substituent group which is convertible into an ion-conducting group to partial hydrolysis, optionally in a solvent, for example, at a temperature of 20 to 30° C., then working the resultant hydrolyzate into a predetermined shape such as granular or film shape, and subsequently heating at a temperature of 150 to 250° C., for example, for removing the solvent and the excess of water and allowing for a progress of copolycondensation and imidization, thus yielding a copolycondensate having a substituent group which is convertible into an ion-conducting group.

By further converting the substituent group which is convertible into an ion-conducting group on the resultant copolycondensate into an ion-conducting group, a copolycondensate of the structure that a polyimide terminated with an alkoxysilyl group is co-polycondensed with an alkoxysilane having an ion-conducting group according to the invention may be obtained. Where the substituent group which is convertible into an ion-conducting group is a mercapto group, the mercapto group may be converted into an ion-conducting group or sulfonic acid group by oxidizing the mercapto group in a well-known way. Alternatively, a vinyl-containing sulfonic acid or salt thereof may be added to the mercapto group through radical addition reaction induced by ultraviolet irradiation in the presence of a photo-radical generator, for example, thereby endowing the polycondensate with a sulfonic acid group. In this case, a copolycondensate of the structure that a polyimide terminated with an alkoxysilyl group is co-polycondensed with an alkoxysilane having a sulfonic acid group is obtainable. Specific examples of the vinyl-containing sulfonic acid include vinylsulfonic acid, allylsulfonic acid, methallylsulfonic acid, and styrenesulfonic acid, and examples of their salts include lithium, sodium, potassium, ammonium, alkylammonium, and pyridinium salts.

Note that the polyimide terminated with an alkoxysilyl group (polyimide precursor) and the alkoxysilane having a substituent group which is convertible into an ion-conducting group are combined so as to give a ratio of polyimide (polyimide precursor) to alkoxysilane in the range between 1:0.5 and 1:20 on a molar basis.

The copolycondensate of a polyimide terminated with an alkoxysilyl group with an alkoxysilane having an ion-conducting group according to the invention functions as a solid polymer electrolyte so that it is suitable as the electrolyte in fuel cells, especially direct methanol fuel cells. This copolycondensate electrolyte may serve as an electrolyte membrane for fuel cells if it is formed into a film by any well-known techniques such as casting, spin coating and die coating, or as a binder for fuel cells if it is formed into particles by any well-known techniques.

The electrolyte membrane of the invention is useful as a solid polymer electrolyte membrane for use in fuel cells, specifically direct methanol fuel cells. A membrane-electrode assembly (electrolyte membrane-electrode assembly) using the electrolyte membrane may be assembled by disposing the electrolyte membrane between first and second electrodes each having a catalyst carried thereon (or fuel and air electrodes) in close contact therewith, thereby yielding an electrolyte membrane-electrode assembly for fuel cells. This electrolyte membrane-electrode assembly may be manufactured by the following method.

Electrodes serving as an anode (fuel electrode) and a cathode (air electrode) are joined to the electrolyte membrane for fuel cells. The electrodes used herein comprise a porous support and a catalyst layer. For the porous support, carbon paper, carbon cloth or the like is preferably used. Also preferably the catalyst layer comprises a fine-particle catalyst and a proton-conducting polymer electrolyte.

The fine-particle catalyst used herein is selected from platinum group metal fine-particle catalysts and platinum alloy fine-particle catalysts. The platinum group metal fine-particle catalysts include platinum, ruthenium, palladium, rhodium, iridium, osmium and the like. The platinum alloy fine-particle catalysts include alloys of platinum with at least one metal selected from among ruthenium, palladium, rhodium, iridium, osmium, molybdenum, tin, cobalt, nickel, iron, chromium and the like. The platinum alloy should preferably contain at least 5%, and more preferably at least 10% by weight of platinum.

The platinum group metal fine-particle catalysts and platinum alloy fine-particle catalysts have a particle size (or average particle size) of up to 4 nm, preferably 1 to 4 nm, and more preferably 2 to 3.5 nm. A catalyst with a particle size in excess of 4 nm has a smaller specific surface area and may suffer from a loss of catalytic activity. It is noted that the particle size is as observed under a transmission electron microscope.

The fine-particle catalyst used herein may be one supported on carbon, and any commercially available catalysts may be used.

The amount of the catalyst in the fine-particle catalyst is 0.05 to 1 mg/cm$^2$, preferably 0.3 to 0.5 mg/cm$^2$ of each electrode catalyst layer in the case of hydrogen fuel, and 0.5 to 10 mg/cm$^2$, preferably 3 to 5 mg/cm$^2$ of each electrode catalyst layer in the case of methanol fuel. Less amounts of the catalyst may fail to provide satisfactory catalytic effect whereas excessive amounts may form a thicker catalyst layer, which may lead to a lower power.

As the proton-conductive polymer electrolyte having a sulfonic acid group, the electrolyte of the invention may be used, and use may also be made of perfluoro electrolytes as typified by Nafion (trade name, by DuPont), hydrocarbon electrolytes as typified by styrenesulfonic acid-butadiene copolymers, and inorganic/organic hybrid electrolytes as typified by sulfonic acid group-containing alkoxysilanes and terminally silylated oligomers. Further, carbon fine particles having no catalyst supported thereon may be compounded for the purpose of improving electron conduction.

Notably, to the catalyst paste from which the catalyst layer is formed, a solvent may be added for the purpose of improving coating operation when the catalyst paste is applied to the electrode and/or electrolyte membrane. The solvents used herein include alcohols such as methyl alcohol, ethyl alcohol, n-propyl alcohol, isopropyl alcohol, n-butyl alcohol, ethylene glycol, and glycerol; ketones such as acetone and methyl ethyl ketone; esters such as ethyl acetate and butyl acetate; ethers such as tetrahydrofuran and dioxane; aromatic hydrocarbons such as benzene and toluene; aliphatic or alicyclic hydrocarbons such as n-heptane, n-hexane and cyclohexane; and polar solvents such as water, dimethyl sulfoxide, N,N-dimethylformamide, N,N-dimethylacetamide, formamide, N-methylformamide, N-methylpyrrolidone, ethylene carbonate, and propylene carbonate. These solvents may be used alone or in admixture of two or more. Of these, polar solvents such as isopropyl alcohol, water, and N,N-dimethylformamide are desirable.

Also a fluorocarbon resin can be added to the paste in order to increase the porosity of the catalyst layer to facilitate transportation of water. Suitable fluorocarbon resins include polytetrafluoroethylene (PTFE), tetrafluoroethylene-hexafluoropropylene copolymers (FEP), tetrafluoroethylene-perfluoroalkyl vinyl ether copolymers (PFA), polychlorotrifluoroethylene (PCTFE), ethylene-tetrafluoroethylene copolymers (ETFE), polyvinylidene fluoride (PVDF), polyvinyl fluoride (PVF), trifluoroethylene-ethylene copolymers (ECTFE), which may be used alone or in combination of two or more. The fluorocarbon resins used herein may be commercially available resins having a number average molecular weight of the order of 100,000 to 600,000 as measured by GPC versus polystyrene standards.

Although the amounts of the foregoing components used vary over a wide range, the preferred amounts are 50 to 200 parts by weight of the proton-conducting polymer electrolyte, 0 to 5,000 parts by weight, more specifically 100 to 1,000 parts by weight of the solvent, and 10 to 400 parts by weight, more specifically 40 to 130 parts by weight of the fluorocarbon resin, relative to 100 parts by weight of the catalyst particles. From the catalyst paste described above, a catalyst layer is formed in a standard way by applying the paste onto the electrolyte membrane or porous electrode substrate, and if the solvent has been added to the paste, removing the solvent.

After the catalyst layer is formed on at least one of the electrolyte membrane and the electrode substrate, a membrane-electrode assembly may be prepared by sandwiching the electrolyte membrane on opposite surfaces between electrode substrates and hot pressing them together. While the hot pressing temperature may be selected as appropriate depending on the electrolyte membrane or the type and blend ratio of components and fluorocarbon resin in the catalyst paste used, the desired temperature range is from 50 to 200° C., and more desirably 80 to 180° C. Temperatures below 50° C. may achieve an insufficient bond whereas temperatures above 200° C. may cause degradation of the electrolyte membrane or the resin component in the catalyst layer. While the applied pressure level may be selected as appropriate depending on the electrolyte membrane and/or the type and blend ratio of components and fluorocarbon resin in the catalyst paste and the type of porous electrode substrate, the desired pressure range is from 1 to 100 kgf/cm$^2$, and more desirably 10 to 100 kgf/cm$^2$. Pressures below 1 kgf/cm$^2$ may provide an insufficient bond whereas pressures above 100 kgf/cm$^2$ may reduce the porosity of the catalyst layer and electrode substrate, leading to degraded performance.

The electrolyte membrane of the invention may be used as a solid polymer electrolyte membrane to be disposed between fuel and air electrodes in a fuel cell. The arrangement of a catalyst layer/fuel diffusion layer and a separator on both surfaces of a solid polymer electrolyte membrane ensures that the electrolyte membrane functions properly in a direct methanol fuel cell, enabling construction of a fuel cell with improved cell characteristics. Note that the construction and materials of fuel and air electrodes and the fuel cell design may be in accord with the standard technology.

EXAMPLE

Examples are given below for illustrating the invention, but the invention is not limited thereto.

Example 1

(1) Synthesis of Polyamic Acid

A 300-ml separable flask equipped with a stirrer and a condenser was charged with 4.36 g (20.0 mmol) of pyromellitic dianhydride and 48.9 g of dry dimethylacetamide. In a nitrogen stream, the contents were stirred at 360 rpm for dissolution. With stirring at 180 rpm, a solution of 2.00 g (10.0 mmol) of diaminodiphenyl ether in 6.4 g of dry dimethylacetamide was slowly added dropwise at 24° C. The temperature rose with dropwise addition and reached 28° C. at the end of addition. This was followed by stirring at 23-25° C. for one hour.

Next, 3.71 g (20.7 mmol) of aminopropyltrimethoxysilane was slowly added dropwise. The temperature rose with dropwise addition and reached 28° C. at the end of addition. The reaction mixture was then stirred at 24-26° C. for one hour. With heating at 51° C. in an oil bath, it was stirred for a further one hour until the reaction was completed. The solution was concentrated under a reduced pressure on a rotary evaporator, yielding a 45 wt % solution of polyamic acid having alkoxysilyl groups at both ends.

(2) Partial Hydrolysis

The viscous, clear, yellow solution obtained in (1), 1.70 g, was mixed with 0.39 g of mercaptopropyltrimethoxy-silane and 0.32 g of dimethylacetamide. Then 0.11 g of deionized water was added to the mixture, which was stirred. The mixture first turned white cloudy and soon became a clear homogeneous solution together with an exotherm. Stirring was stopped when the solution started thickening, and the solution was kept stationary until bubbles vanished away.

(3) Copolycondensation and Imidization

The viscous, clear, pale yellow solution obtained in (2) was cast on a glass plate by means of an applicator and kept at 100° C. and atmospheric pressure for removing the solvent, after which the coating was peeled from the glass plate as a clear pale yellow film. This film was sandwiched between Teflon® sheets, which was heated at 200° C. under a vacuum of about 5 Torr for 6 hours, yielding a clear yellow hard film of 44 μm thick. IR absorption spectroscopy identified the formation of a polymide film containing siloxane bonds.

(4) Sulfonation

A 30-ml plugged test tube was charged with 2.26 g of m-chloroperbenzoic acid and 25 ml of methylene chloride to form a solution. A sample of 5 cm×1.5 cm was cut out of the film obtained in (3) and immersed in this solution at 23° C. for 4 hours. The sample was taken out, washed with methylene chloride, and heat dried at 100° C. under a vacuum of about 5 Torr for 2 hours. The sample showed a weight gain of 9.0%, and absorption peaks of sulfonic acid group developed in its IR absorption spectrum.

(5) Evaluation of Electrolyte Membrane

The resulting electrolyte membrane was measured for ion conductivity, strength, toughness, swell, and fuel permeability by the following methods, with the results being shown in Table 1.

Ion conductivity: Using an impedance analyzer (1260 by Solartron), the resistivity in a longitudinal direction of a strip-shaped sample (1 cm width) at room temperature in hydrous state was measured in accordance with the four-terminal AC impedance method, from which an ion conductivity was computed.

Strength: Using a tensile tester (Autograph AGS-500G by Shimadz Mfg. Co., Ltd.), a dumbbell-shaped sample (6 mm width) at room temperature in hydrous state was tested at a pull rate of 50 mm/min.

Toughness: A strip-shaped sample (5 mm width) at room temperature in hydrous state was repeatedly folded at an angle of 135°.

Swell: determined from the difference between the weight of a wet film after immersion in deionized water at 60° C. and cooling and the weight of a dry film after vacuum drying at 100° C.

Swell (%)=[(wet film weight)−(dry film weight)]/(dry film weight)×100

Fuel permeability: In a setup where 10 mol/L methanol water and deionized water were separated by a membrane, the amount of methanol that permeated through the membrane from the methanol water side to the deionized water side at room temperature was quantitatively determined by gas chromatography.

TABLE 1

| | Ion conductivity | Strength | Toughness | Swell | Fuel permeability |
|---|---|---|---|---|---|
| Example 1 | 0.055 S/cm | 27 MPa | 19 times | 16% | $1.1 \times 10^{-7}$ m$^2$/hr |

As demonstrated by these results, the electrolyte membrane has a high ion conductivity, high strength, high toughness, low swell, and low fuel permeability and performs well as an electrolyte membrane for fuel cells.

Example 2

(1) Synthesis of Polyamic Acid

A 300-ml separable flask equipped with a stirrer and a condenser was charged with 4.02 g (20.1 mmol) of diaminodiphenyl ether and 79.0 g of dry dimethylacetamide. In a nitrogen stream, the contents were stirred at 180 rpm for dissolution. While the solution was cooled in a cold water bath, 4.86 g (22.3 mmol) of pyromellitic dianhydride in solid form was slowly added at 12° C. The temperature rose from the start of addition and reached 18° C. at the end of addition. This was followed by stirring at 15-17° C. for one hour.

Next, with the cooling bath taken off, 1.01 g (4.56 mmol) of aminopropyltriethoxysilane was slowly added dropwise at 23° C. The temperature rose with dropwise addition and reached 25° C. at the end of addition. The reaction mixture was then stirred at 25° C. for 1.5 hours. With heating at 48° C. in an oil bath, it was stirred for a further one hour until the reaction was completed.

(2) Copolycondensation and Imidization

The viscous, clear, yellow solution obtained in (1), 1.92 g, was combined with 0.10 g of mercaptopropyltrimethoxysilane and stirred in air. This solution was cast on a glass plate by means of an applicator and kept at 80° C. and atmospheric pressure for removing the solvent, after which the coating was peeled from the glass plate as a clear pale yellow film. This film was sandwiched between Teflon® sheets, which was heated at 200° C. under a vacuum of about 5

Torr for 6 hours, yielding a clear brown hard film of 87 μm thick. IR absorption spectroscopy identified the formation of a polyimide film containing siloxane bonds.

(3) Sulfonation

A 100-ml beaker was charged with 50 ml of 30% aqueous hydrogen peroxide, in which a sample of the film obtained in (2) was immersed at 50° C. for 9 hours. The sample was taken out, washed with deionized water, and heat dried at 100° C. under a vacuum of about 5 Torr for 4 hours. The sample showed a weight gain of about 1%, and absorption peaks of sulfonic acid group developed in its IR absorption spectrum. By acid-base titration, the ion exchange capacity of this film was determined to be 0.9 meq/g, indicating the presence of sulfonic acid groups.

(4) Evaluation of Electrolyte Membrane

The ion conductivity of the electrolyte membrane obtained in (3) was measured by the same method as in Example 1. It had an ion conductivity of 0.032 S/cm at 23° C.

Example 3

(1) Synthesis of Polyamic Acid

A 300-ml separable flask equipped with a stirrer and a condenser was charged with 10.67 g (48.9 mmol) of pyromellitic dianhydride and 112 g of dry dimethylacetamide. In a nitrogen stream, the contents were stirred at 180 rpm for dissolution. With stirring in a cold water bath, a solution of 7.89 g (39.4 mmol) of diaminodiphenyl ether in 18.4 g of dry dimethylacetamide was slowly added dropwise at 18° C. The temperature rose with dropwise addition and reached 20° C. at the end of addition. With the cooling bath taken off, the reaction mixture was then stirred at 24-29° C. for 3 hours.

Next, a solution of 3.40 g (19.0 mmol) of aminopropyltrimethoxysilane in 7.90 g of dry dimethylacetamide was slowly added dropwise to the reaction mixture which was cooled in a cold water bath at 18° C. The temperature rose with dropwise addition and reached 20° C. at the end of addition. With the cooling bath taken off, the reaction mixture was then stirred at 26-28° C. for 3 hours. While heating at 48° C. in an oil bath, the reaction mixture was stirred for a further 6 hours until the reaction was completed. A 14 wt % dimethylacetamide solution of alkoxysilyl-terminated polyamic acid was obtained.

(2) Partial Hydrolysis of Alkoxysilane

A 300-ml separable flask equipped with a stirrer and a condenser was charged with 19.7 g (100 mmol) of mercaptopropyltrimethoxysilane, which was stirred at 240 rpm in a nitrogen stream. With cooling in a cold water bath, 1.93 g of 0.1 mol % hydrochloric acid (hydrogen chloride 0.1 mmol+ water 107 mmol) was slowly added dropwise at 11° C.

The mixture turned white cloudy immediately after dropwise addition and soon became clear. Thereafter, with cooling, the reaction mixture was stirred at 11° C. for 0.5 hour. Then with heating at 65° C. in an oil bath, the reaction mixture was stirred for 3 hours. With an ester adaptor attached to the separable flask, the flask was heated at 65° C. to distill off about 1.7 g of methanol, yielding a partial hydrolyzate of mercaptopropyltrimethoxysilane.

(3) Endowment of Sulfonic Acid Group

In 0.33 g of dimethylacetamide were dissolved 0.68 g (mercapto group 4.6 mmol) of the partial hydrolyzate of mercaptopropyltrimethoxysilane obtained in (2), 0.84 g (4.0 mmol) of the triethylammonium salt of vinylsulfonic acid, and 0.08 g of benzophenone as a photo-radical generator. The solution was kept stationary at 20 cm below a 80 W/cm metal halide UV lamp. In a nitrogen atmosphere, the solution was irradiated with UV radiation for 10 minutes, obtaining a partial hydrolyzate of mercaptopropyltrimethoxysilane having a vinylsulfonic acid salt added thereto.

(4) Copolycondensation and Imidization

To 1.86 g of the partial hydrolyzate of mercaptopropyltrimethoxysilane having a vinylsulfonic acid salt added thereto obtained in (3) were added 8.23 g of the alkoxysilyl-terminated polyamic acid solution obtained in (1) and 0.01 g of acetylacetonatoaluminum as a condensation catalyst. The mixture was heated at 60° C. under a vacuum of about 5 Torr for concentration. When a certain viscosity buildup was observed, the mixture was cast on a glass plate by means of an applicator. The coating was heated at 100° C. and atmospheric pressure for removing the solvent, and further heated at 180° C. and a vacuum of about 5 Torr for 5 hours for effecting copolycondensation and imidization simultaneously. The coating was peeled from the glass plate as a clear yellow hard film of 50 μm thick. IR absorption spectroscopy identified the formation of a polyimide film containing sulfonic acid groups and siloxane bonds.

(5) Evaluation of Electrolyte Membrane

The polyimide film containing sulfonic acid groups and siloxane bonds obtained in (4) was immersed overnight in deionized water at 80° C. and then in 2 mol/L hydrochloric acid at room temperature for 4 hours, and washed with deionized water, before it was measured for ion conductivity by the same method as in Example 1. It had an ion conductivity of 0.038 S/cm at 24° C.

The invention claimed is:

1. An electrolyte for a fuel cell, comprising a copolycondensate of (1) a polyimide terminated with an alkoxysilyl group and (2) an alkoxysilane having an ion-conducting group.

2. The electrolyte according to claim 1 wherein the polyimide terminated with an alkoxysilyl group is of formula (1):

[Chemical Formula 1]

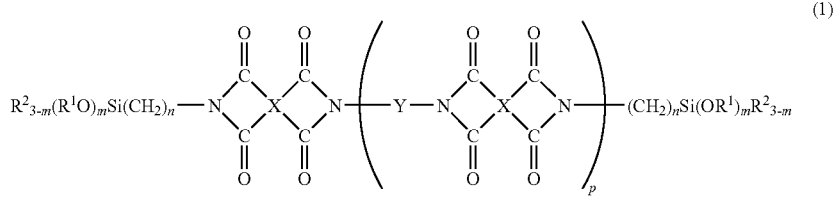

(1)

wherein $R^1$ is alkyl, $R^2$ is a monovalent hydrocarbon group of 1 to 8 carbon atoms, X is a tetravalent organic group having at least one aromatic ring, Y is a divalent organic group, n is an integer of 0 to 6, p is an integer of 0 to 9, and m is an integer of 1 to 3.

3. The electrolyte according to claim 1 wherein the ion-conducting group is a sulfonic acid group.

4. The electrolyte according to claim 3 wherein the sulfonic acid group is obtained by adding a vinyl-containing sulfonic acid or a salt thereof to a mercapto group.

5. The electrolyte according to claim 1 wherein the sulfonic acid group is obtained from oxidation of a mercapto group.

6. An electrolyte membrane for fuel cells, comprising the electrolyte according to claim 1.

7. A membrane electrode assembly for fuel cells, comprising the electrolyte membrane according to claim 6.

8. A fuel cell comprising the membrane electrode assembly according to claim 7.

9. The fuel cell according to claim 8, wherein the fuel cell is a direct methanol fuel cell.

10. A binder for fuel cells, comprising the electrolyte according to claim 1.

11. The electrolyte according to claim 1 wherein the alkoxysilane having an ion-conducting group is derived from a mercapto-containing alkoxysilane.

12. The electrolyte according to claim 11 wherein the mercapto-containing alkoxysilane is selected from the group consisting of 3-mercaptopropyltrimethoxysilane, 3-mercaptopropyltriethoxysilane, 3-mercaptodimethoxymethylsilane, 3-mercaptopropyldiethoxymethylsilane, 3-mercaptopropyldimethylmethoxysilane, and 3-mercaptopropyldimethylethoxysilane.

* * * * *